United States Patent [19]

Urano

[11] 3,774,994
[45] Nov. 27, 1973

[54] LENS AND SIGHT ADJUSTOR FOR CAMERA VIEW FINDER

[75] Inventor: Fumio Urano, Tokyo, Japan

[73] Assignee: Asahi Kogaku Kogyo Kabushiki Kaisha, Tokyo, Japan

[22] Filed: July 6, 1972

[21] Appl. No.: 269,382

[30] Foreign Application Priority Data
July 28, 1971  Japan ....... 46/67227 (utility model)

[52] U.S. Cl. ..................... 350/252, 350/245, 88/1.5
[51] Int. Cl. ............................................. G02b 7/02
[58] Field of Search ..................................... 88/1.5; 350/245–257, 311, 318

[56] References Cited
UNITED STATES PATENTS

| | | | |
|---|---|---|---|
| 2,504,255 | 4/1950 | Lanauze | 350/318 |
| 3,174,417 | 3/1965 | Sauer et al. | 88/1.5 R |
| 2,707,418 | 5/1955 | Magnuson | 350/252 |
| 3,521,945 | 7/1970 | Bristol et al. | 350/114 |
| 1,887,654 | 11/1932 | Mahon | 350/318 |
| 2,510,873 | 6/1950 | Early | 350/318 |
| 3,572,905 | 3/1971 | Schlapp | 350/257 |
| 2,753,752 | 7/1956 | Veverka | 350/259 |

FOREIGN PATENTS OR APPLICATIONS

| | | | |
|---|---|---|---|
| 15,196 | 6/1912 | Great Britain | 350/252 |

*Primary Examiner*—David Schonberg
*Assistant Examiner*—Michael J. Tokar
*Attorney*—B. Franklin Griffin, jr. et al.

[57] ABSTRACT

A lens for a sight adjustor on a camera view finder has a resilient portion which compresses when a projection on the lens periphery is inserted into a hollow in the camera view finder's housing. The compression is accomplished by means of a manipulative portion on the lens which projects through a cut-out portion of the view finder housing for manipulation by the user's fingers. The inner portion of the view finder housing is stepped to form a larger and a smaller opening therein. In this manner, when the lens projection is inserted into the hollow and the lens compressed by force of the user's fingers on the manipulative portion of the lens, the lens is adapted to slide into the housing's larger opening to rest against the stepped portion. The housing also includes engaging grooves for engaging a peripheral portion of the lens when it is in position against the stepped portion of the housing to prevent the lens from inadvertently sliding out of contact with the stepped portion.

14 Claims, 6 Drawing Figures

LENS AND SIGHT ADJUSTOR FOR CAMERA VIEW FINDER

This invention relates to a lens and sight adjustor for a camera view finder in which a sight adjusting lens is releasably attached directly to an eyepiece part of the view finder.

There have been previous descriptions of sight adjusting lenses that are interchangeably attached directly to the eyepiece part of a view finder. In one such case, the resiliency of the lens itself was used to effect the interchangeability. That is, the lens was compressed by means of a tool such as a pliers; and the lens was then withdrawn from the view finder. In that arrangement, however, a tool such as a pliers is indispensable for such an attaching and releasing operation. Hence, it is an object of this invention to provide a lens that can be readily attached and released from the sight adjustor by the user's fingers; and without the need for such a tool.

It is also an object of this invention to provide a suitable sight adjustor for use in combination with such a lens so that the sight adjustor and lens are adequately suited for use on a camera.

SUMMARY OF THE INVENTION

In accordance with principles of this invention, the lens is comprised of a viewing portion, a resilient portion, and a manipulative portion. The manipulative portion is adapted to extend through a cut-out portion of the sight adjustor which includes a stepped portion on the inner part thereof and a retaining means for holding the lens in position after it is compressed and slid into position by action of the user's fingers on the manipulative portion of the lens.

In operation, the user grasps the manipulative portion of the lens and inserts a portion of the lens periphery into the viewing aperture. The user then exerts a force on the manipulative portion to compress the lens and slide it inwardly against the stepped portion. The user then removes his fingers to permit the lens to expand into engaging grooves or the like which hold the lens in position against the stepped portion.

The lens is removed from the viewing aperture by again compressing the lens with the user's fingers to disengage its periphery from the retaining means and sliding the manipulative portion through the cut-out.

It will be appreciated from the foregoing brief description that the invention provides an inexpensive interchangeable lens for the eyepiece of a camera view finder wherein the lens does not require any tools for the lens insertion and removal operations.

BRIEF DESCRIPTION OF THE DRAWINGS

The foregoing objects and many of the attendant advantages of this invention will become more readily appreciated as the same become better understood by reference to the following detailed description when taken in conjunction with the accompanying drawings wherein.

Figure 1:
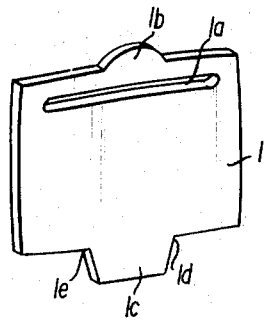
FIG. 1 is a perspective view of an embodiment of a sight adjusting lens constructed in accordance with the invention.

The FIG. 1 embodiment of a sight adjusting lens 1 is provided with a slit 1a in the upper portion thereof. The lens also includes a projection 1b from the upper periphery thereof; and a somewhat larger projection 1c from the lower portion thereof.

Preferably, the lens is comprised of a high molecule material such as a transparent acryl so that the long slit 1a provides sufficient resiliency to facilitate insertion and removal operations of the lens 1 in the eyepiece frame 2 as will be described shortly.

The projection 1c tapers downwardly from the viewing portion of the lens 1 so that shoulders 1d and 1e engage portions of a retaining means on an eyepiece frame 2 while the lowermost portion of the projection 1c extends through a cut-out portion 8 of the eyepiece frame as will now be described.

Figure 2:
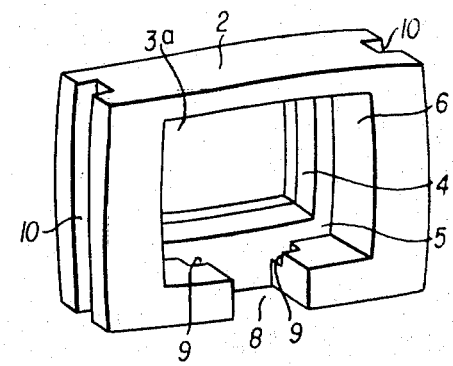
FIG. 2 is a perspective view of an eyepiece frame for a camera view finder.
Figure 4:
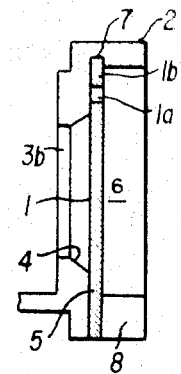
FIG. 4 is a sectional, side elevational view of the embodiment illustrated in FIG. 3.

As shown in FIGS. 2 and 4, the eyepiece frame 2 has a first opening 3a and a smaller opening 3b having sides 4 which slope outwardly as shown in FIG. 4 so that the smaller opening or window 3b is enlarged toward the right side in FIG. $. The inner portion of the eyepiece frame is of a stepped construction. That is, an inner vertical wall 5 meets generally orthogonal walls 6 so that the larger opening 3a is generally shaped to fit the periphery of the lens 1.

Figure 3:
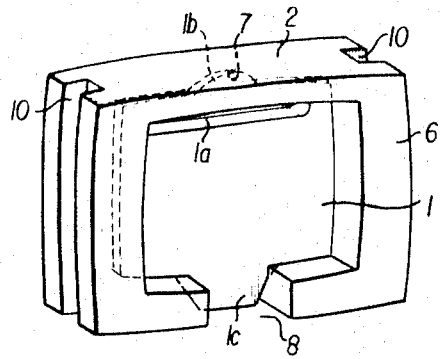
FIG. 3 is a perspective view of the FIG. 1 lens in combination with the eyepiece frame of FIG. 2.

The FIG. 3 embodiment of the invention includes a hollowed out portion 7 in a portion of a wall 6 adjacent to the stepped wall 5 accommodate the upper projecting portion 1b of the lens 1. Similarly, the middle portion of the lower wall 6 is cut-out at 8 to accommodate and guide the lower projection 1c of the lens 1. In addition, the lower wall 6 includes a pair of engaging grooves 9 for retaining the lens 1 in place at the portions adjacent shoulders 1e and 1d.

The eyepiece frame 2 also includes grooves 10 along its sides to accommodate clips or the like for attaching accessories.

In operation, the lens 1 is inserted into the eyepiece frame from the rear side by holding projection 1c between the user's fingers and pushing projection 1b into the hollow 7 of the eyepiece frame as shown by the dotted lines in FIG. 3. The user then pushes upwardly on projection 1c so that the lens is compressed at its resilient portion—slot 1a in the FIG. 1 embodiment—and projection 1c is directed into the cut-out 8 until the lens 1 comes into close contact with the stepped wall 5. The force on tab 1c is then released so that the resilient portion of the lens causes its lower portion to move downwardly until the shoulders 1e and 1d are engaged by the retaining grooves 9 which prevent inadvertent disengagement of the lens 1.

In order to remove the lens 1 the above described operation is merely reversed. That is, projection 1c is first pushed upwardly by the user's fingers until the shoulder portions of the lens clear the lower wall portion 6 adjacent the retaining grooves 9. The projection 1c is then slide outwardly through the cut-out portion 8 so that the entire lens can be conveniently removed.

Figure 5:
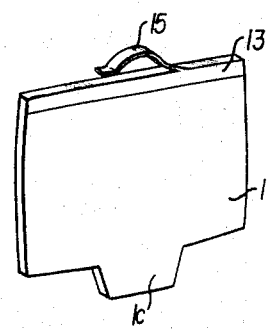
FIG. 5 is a perspective view of an alternative embodiment of a lens according to the invention; and, FIG. 6 is an enlarged perspective view of a resilient projection portion of the lens illustrated in FIG. 5.
Figure 6:
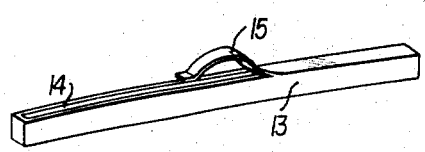

In an alternative embodiment, a channel-shaped resilient member 13 (FIG. 6) is located on top of the viewing portion of the lens 1 as illustrated in FIG. 5. A portion of the resilient member's top 14 is cut out and bent to form a spring member 15. In this manner, it is not necessary for the lens to have its own resiliency. Hence, this embodiment permits the lens to be manufactured from conventional glass material.

Insertion and removal operations of the alternative embodiment of the lens are carried out in the same manner as in the previously described embodiment except that the spring 15 engages the retaining hollow 7 instead of the FIG. 1 embodiment's engagement thereof by the upper projection 1b.

It will be appreciated from the foregoing description, that the instant invention provides a sight adjusting lens that is easily installed and removed by the user's fingers without the requirement for special tools. Similarly, the lens is adapted to be directly inserted into a compatible eyepiece frame itself without the requirement for separate adaptors or retaining mechanisms. Moreover, the insertion and removal operations can be readily accomplished which, in itself, provides a considerable practical advantage.

While the foregoing has described preferred embodiments of the invention, it will be appreciated by those skilled in the art that various changes can be made therein without departing from the spirit and scope of the invention. For example, the projection 1c can be provided with an indication of the sight value for that particular lens. Hence, the invention can be practiced other than as specifically described herein.

The embodiments of the invention in which an exclusive property or privilege is claimed are defined as follows:

1. A lens adapted for use in the housing of a sight adjustor for a camera view finder of the type having a viewing aperture and a retaining means for holding a viewing portion of said lens in alignment with said viewing aperture, said lens comprising:
   said viewing portion;
   a resilient portion; and
   a manipulation portion;
   said manipulation portion being adapted for manipulation by the fingers of a user to urge said lens against said housing so that said resilient portion compresses to permit said lens to slide into engagement with said retaining means; and
   said resilient portion being adapted to expand upon release of said manipulative portion by said user's fingers so that said viewing portion is aligned with said viewing aperture and said manipulative portion is engaged by said retaining means.

2. The lens of claim 1 including a projection on the periphery of said lens, said projection adapted to engage with a corresponding recess on said housing.

3. The lens of claim 1 wherein said resilient portion projects outwardly at the periphery of said lens and is adapted to engage with a corresponding recess in said housing.

4. The lens of claim 1 in combination with a sight adjustor housing having a retaining means including:
   a stepped portion along the axis of said viewing aperture so that said sight adjustor has a first opening and a smaller second opening; and
   engaging means in said first opening for engaging a portion of the periphery of said lens to hold said lens adjacent said stepped portion when said resilient portion is returned to said expanded position.

5. The apparatus of claim 4 wherein said first opening includes a hollow in the portion of said first opening adjacent the periphery of said lens; and said lens includes a projection on the periphery thereof for engagement with said hollow.

6. The lens of claim 4 including a hollow in the portion of said first opening adjacent the periphery of said lens and wherein said resilient portion projects outwardly at the periphery of said lens for engagement with said hollow.

7. The apparatus of claim 4 wherein the manipulative portion extends outwardly from the periphery of said lens and said first opening includes a cut-out section for receiving said manipulative portion.

8. The apparatus of claim 7 wherein said engaging means includes a groove adjacent said cut-out portion, said groove adapted to engage the periphery of said lens when the resilient portion is returned to said expanded position.

9. The apparatus of claim 8 wherein said first opening includes a hollow in the portion of said first opening adjacent the periphery of said lens; and said lens includes a projection on the periphery thereof for engagement with said hollow.

10. The lens of claim 8 including a hollow in the portion of said first opening adjacent the periphery of said lens and wherein said resilient portion projects outwardly at the periphery of said lens for engagement with said hollow.

11. The apparatus of claim 4 wherein the side walls of said smaller opening slope inwardly toward the axis of said viewing aperture.

12. The apparatus of claim 4 wherein said sight adjustor housing includes grooves along the outer sides thereof to accommodate accessory attachments.

13. The lens of claim 1 wherein said manipulative portion includes indicia thereon for indicating an optical value for said lens.

14. The lens of claim 1 wherein said resilient portion includes a channel-shaped member adapted to fit over the periphery of said viewing portion, said channel shaped member having a portion therein cut out and bent to form a spring, whereby said lens is adapted to have the viewing parts thereof constructed of conventional glass material.

* * * * *